United States Patent
Nakagawa

(10) Patent No.: US 10,346,110 B2
(45) Date of Patent: Jul. 9, 2019

(54) INFORMATION PROCESSING APPARATUS, METHOD AND STORAGE MEDIUM PERFORMING PROHIBITION PROCESSING FOR PRINT SETTINGS

(71) Applicant: CANON KABUSHIKI KAISHA, Tokyo (JP)

(72) Inventor: Masashi Nakagawa, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/001,801

(22) Filed: Jan. 20, 2016

(65) Prior Publication Data
US 2016/0224293 A1 Aug. 4, 2016

(30) Foreign Application Priority Data

Jan. 29, 2015 (JP) .................................. 2015-015925
Nov. 12, 2015 (JP) .................................. 2015-221945

(51) Int. Cl.
*G06F 3/12* (2006.01)

(52) U.S. Cl.
CPC .......... *G06F 3/1239* (2013.01); *G06F 3/1203* (2013.01); *G06F 3/1231* (2013.01); *G06F 3/1255* (2013.01); *G06F 3/121* (2013.01)

(58) Field of Classification Search
CPC ................................ G06F 3/1255; G06F 3/121
See application file for complete search history.

(56) References Cited

U.S. PATENT DOCUMENTS

| 8,773,694 B2 | 7/2014 | Takagi | |
|---|---|---|---|
| 2007/0195336 A1* | 8/2007 | Uotani | G06F 3/1204 358/1.1 |
| 2014/0022579 A1* | 1/2014 | Edamatsu | G06K 15/1805 358/1.13 |
| 2014/0055799 A1 | 2/2014 | Nakagawa | |

FOREIGN PATENT DOCUMENTS

JP 2004-326040 11/2004

* cited by examiner

*Primary Examiner* — Peter K Huntsinger
(74) *Attorney, Agent, or Firm* — Venable LLP

(57) ABSTRACT

An information processing apparatus is provided that includes a determination unit configured to determine whether or not a sheet size included in print settings is a user-defined size; a decision unit configured to decide a fixed size as a sheet size used for prohibition processing based on a width and a height of the user-defined size if the sheet size is the user-defined size; a storage unit configured to store the user-defined size set as the sheet size in the print settings; a changing unit configured to change the sheet size in the print settings from the user-defined size to the fixed size; and a prohibition processing unit configured to perform the prohibition processing for the print settings changed by the changing unit. The changing unit returns the sheet size of the print settings in which the prohibition processing is performed to the user-defined size stored by the storage unit.

1 Claim, 17 Drawing Sheets

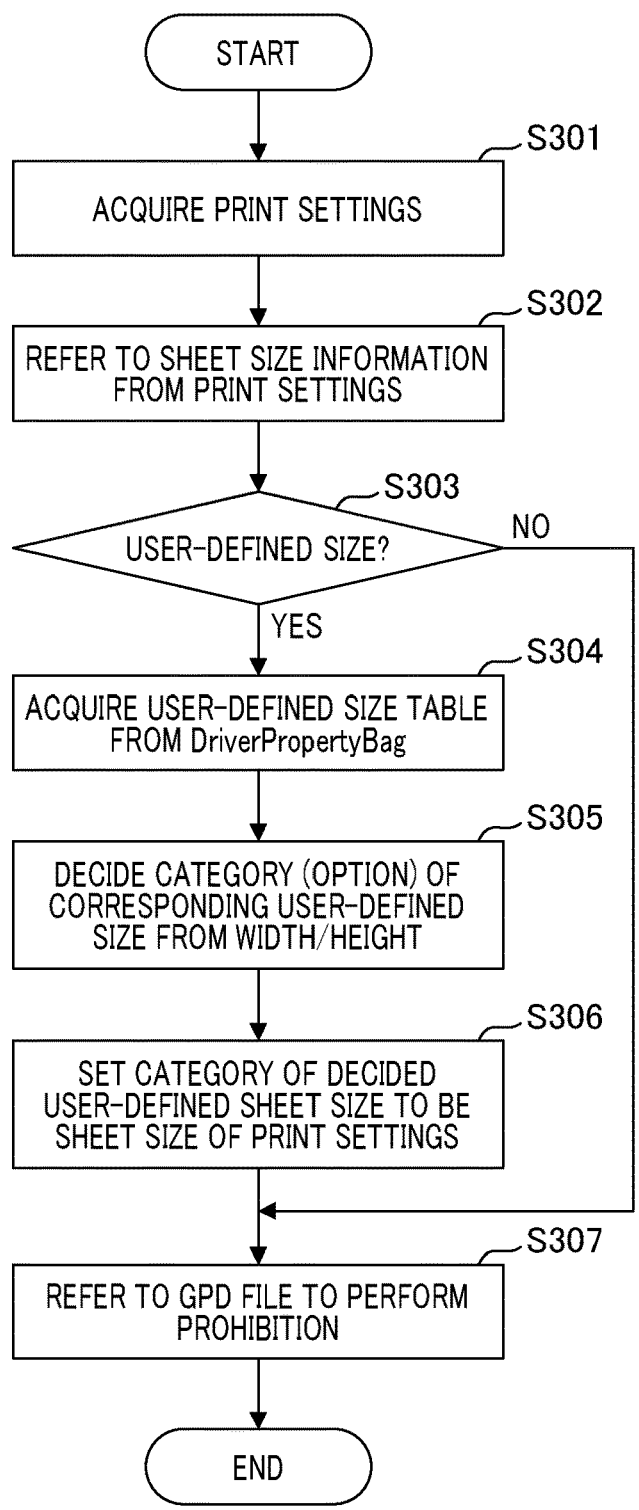

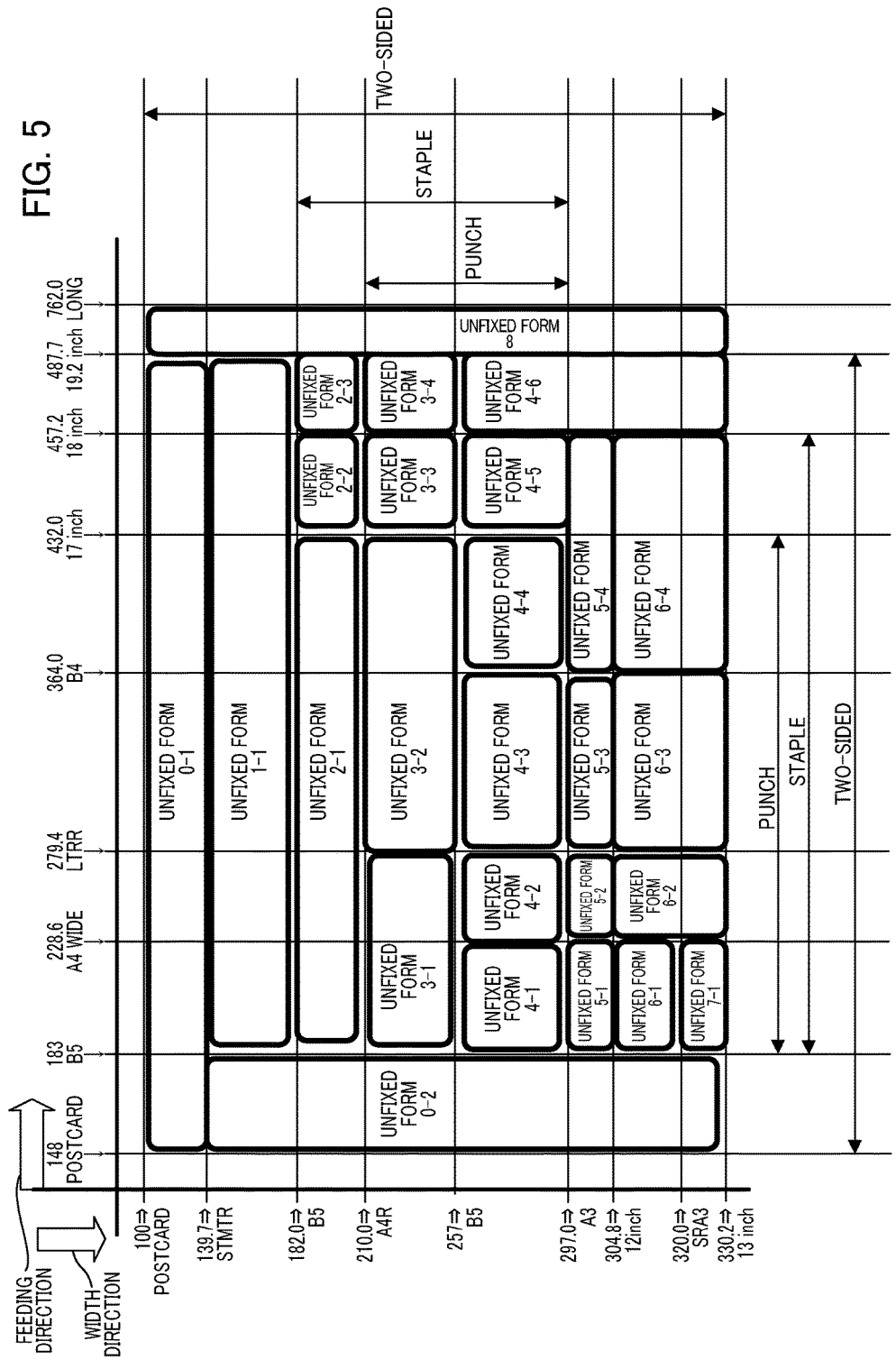

FIG. 6

| Category | Size width X | Size height Y | Two-sided | punch | staple | Replacement option |
|---|---|---|---|---|---|---|
| Unfixed form 0-1 | 100.0~139.6 | 148.0~487.7 | ✓ | N/A | N/A | Custom0_1 |
| Unfixed form 0-2 | 139.7~330.2 | 148.0~181.9 | ✓ | N/A | N/A | Custom0_2 |
| .. | .. | .. | .. | .. | .. | .. |
| Unfixed form 3-1 | 210.0~256.9 | 182.0~279.3 | ✓ | ✓ | ✓ | Custom3_1 |
| Unfixed form 3-2 | 210.0~256.9 | 279.4~432.0 | ✓ | ✓ | ✓ | Custom3_2 |
| Unfixed form 3-3 | 210.0~256.9 | 432.1~457.2 | ✓ | N/A | ✓ | Custom3_3 |
| Unfixed form 3-4 | 210.0~256.9 | 457.2~487.7 | ✓ | N/A | N/A | Custom3_4 |
| Unfixed form 4-1 | 257.0~297.0 | 182.0~228.6 | ✓ | ✓ | ✓ | Custom4_1 |
| Unfixed form 4-2 | 257.0~297.0 | 228.7~279.3 | ✓ | ✓ | ✓ | Custom4_2 |
| Unfixed form 4-3 | 257.0~297.0 | 279.4~363.9 | ✓ | ✓ | ✓ | Custom4_3 |
| .. | .. | .. | .. | .. | .. | .. |
| Unfixed form 7-1 | 320.1~330.2 | 182.0~228.6 | ✓ | N/A | N/A | Custom7_1 |
| Unfixed form 8 | 100.0~330.2 | 487.8~762.0 | N/A | N/A | N/A | Custom8 |

FIG. 8

```
*%*********************************************************************
*%                    Duplex
*%*********************************************************************
*Feature: Duplex
{
        *rcNameID: =PAPER_SIZE_DISPLAY
        *DefaultOption: =Simplex
        *Option: Simplex
        {
                *rcNameID: =OFF_DISPLAY
        }
        *Option: LongEdge
        {
                *rcNameID: =ON_DISPLAY
        }
        *Option: ShortEdge
        {
                *rcNameID: =ON_DISPLAY
        }
}

*%*********************************************************************
*%                    Custom Paper Size
*%*********************************************************************
*Feature: CostomPaperSize  ~501
{
        *rcNameID: =USER_DEFINED_SIZE_DISPLAY
        *DefaultOption: =4_1
        *Option: 0_1
        *Option: 0_2
          :
          :
        *Option: 3_1
        *Option: 3_2
        *Option: 3_3
        *Option: 3_4
        *Option: 4_1
        *Option: 4_2
        *Option: 4_3
          :
          :
        *Option: 7_1
        *Option: 8  ~502
}

*InvalidCombination(CostomPaperSize.8, Duplex.LongEdge)  ~503
*InvalidCombination(CostomPaperSize.8, Duplex.ShortEdge)
```

FIG. 9

```
<Properties Name="CustomPaperSize">
<String>
        {"custompaersize":
            [{"name": "ns0000:0_1", "item":
                [
                    {"name":"ns0000:BasisWidth", "type":"xsd:integer", "value":1000 },
                    {"name":"ns0000:MinBasisWidth", "type":"xsd:integer", "value":1000 },
                    {"name":"ns0000:MaxBasisWidth", "type":"xsd:integer", "value":1396 }
                    {"name":"ns0000:BasisLength", "type":"xsd:integer", "value":1480 },
                    {"name":"ns0000:MinBasisLength", "type":"xsd:integer", "value":1480 },
                    {"name":"ns0000:MaxBasisLength", "type":"xsd:integer", "value":4877 }
                ]
            },
            {"name": "ns0000:1_1", "item":
                [
                    {"name":"ns0000:BasisWidth", "type":"xsd:integer", "value":1397 },
                    {"name":"ns0000:MinBasisWidth", "type":"xsd:integer", "value":1397 },
                    {"name":"ns0000:MaxBasisWidth", "type":"xsd:integer", "value":3302 }
                    {"name":"ns0000:BasisLength", "type":"xsd:integer", "value":1480 },
                    {"name":"ns0000:MinBasisLength", "type":"xsd:integer", "value":1480 },
                    {"name":"ns0000:MaxBasisLength", "type":"xsd:integer", "value":1819 }
                ]
            },
                :
            {"name": "ns0000:3_1", "item":
                [
                    {"name":"ns0000:BasisWidth", "type":"xsd:integer", "value":2100 },
                    {"name":"ns0000:MinBasisWidth", "type":"xsd:integer", "value":2100 },
                    {"name":"ns0000:MaxBasisWidth", "type":"xsd:integer", "value":2569 }
                    {"name":"ns0000:BasisLength", "type":"xsd:integer", "value":1820 },
                    {"name":"ns0000:MinBasisLength", "type":"xsd:integer", "value":1820 },
                    {"name":"ns0000:MaxBasisLength", "type":"xsd:integer", "value":2793 }
                ]
            },
                :
            {"name": "ns0000:7_1", "item":
                [
                    {"name":"ns0000:BasisWidth", "type":"xsd:integer", "value":3201 },
                    {"name":"ns0000:MinBasisWidth", "type":"xsd:integer", "value":3201 },
                    {"name":"ns0000:MaxBasisWidth", "type":"xsd:integer", "value":3302 }
                    {"name":"ns0000:BasisLength", "type":"xsd:integer", "value":1820 },
                    {"name":"ns0000:MinBasisLength", "type":"xsd:integer", "value":1820 },
                    {"name":"ns0000:MaxBasisLength", "type":"xsd:integer", "value":2286 }
                ]
            },
            {"name": "ns0000:8", "item":~601
                [
                    {"name":"ns0000:BasisWidth", "type":"xsd:integer", "value":1000 },
                    {"name":"ns0000:MinBasisWidth", "type":"xsd:integer", "value":1000 },~602
                    {"name":"ns0000:MaxBasisWidth", "type":"xsd:integer", "value":3302 }~603
                    {"name":"ns0000:BasisLength", "type":"xsd:integer", "value":4878 },
                    {"name":"ns0000:MinBasisLength", "type":"xsd:integer", "value":4878 },~604
                    {"name":"ns0000:MaxBasisLength", "type":"xsd:integer", "value":7620 }~605
                ]
            },
        ]
        }
</String>
</Properties>
```

FIG. 10

```
*%***************************************************************
*%                Duplex
*%***************************************************************
*Feature: Duplex
{
        *rcNameID: =PAPER_SIZE_DISPLAY
        *DefaultOption: =Simplex
        *Option: Simplex
        {
                *rcNameID: =OFF_DISPLAY
        }
        *Option: LongEdge
        {
                *rcNameID: =ON_DISPLAY
        }
        *Option: ShortEdge
        {
                *rcNameID: =ON_DISPLAY
        }
}

*Ifdef: EXTENSION_CONSTRAINTS ~701
*%***************************************************************
*%                Custom Paper Size
*%***************************************************************
*Feature: CostomPaperSize
{
        *rcNameID: =USER_DEFINED_SIZE_DISPLAY
        *DefaultOption: =4_1
        *Option: 0_1
        *Option: 0_2
          :
          :
        *Option: 3_1
        *Option: 3_2
        *Option: 3_3
        *Option: 3_4
        *Option: 4_1
        *Option: 4_2
        *Option: 4_3
          :
          :
        *Option: 7_1
        *Option: 8
}

*InvalidCombination(CostomPaperSize.8, Duplex.LongEdge)
*InvalidCombination(CostomPaperSize.8, Duplex.ShortEdge)
*Endif: *% EXTENSION_CONSTRAINTS ──702
```

FIG. 11

| Category | Size width X | Size height Y | Two-sided | punch | staple | Replacement option |
|---|---|---|---|---|---|---|
| Unfixed form 0-1 | 100.0~139.6 | 148.0~487.7 | ✓ | N/A | N/A | Custom0_1 |
| Unfixed form 0-2 | 139.7~330.2 | 148.0~181.9 | ✓ | N/A | N/A | JAPANESE_POSTCARD |
| .. | .. | .. | .. | .. | .. | .. |
| Unfixed form 3-1 | 210.0~256.9 | 182.0~279.3 | ✓ | ✓ | ✓ | B5 |
| .. | .. | .. | .. | .. | .. | .. |
| Unfixed form 7-1 | 320.1~330.2 | 182.0~228.6 | ✓ | N/A | N/A | 13x19 |
| Unfixed form 8 | 100.0~330.2 | 487.8~762.0 | N/A | N/A | N/A | Custom8 |

FIG. 13

```
<Properties Name="CustomPaperSize">
<String>
        { "custompaersize":
                [ { "name": "ns0000:0_1", "item":
                        [
                            { "name":"ns0000:BasisWidth", "type":"xsd:integer", "value":1000 },
                            { "name":"ns0000:MinBasisWidth", "type":"xsd:integer", "value":1000 },
                            { "name":"ns0000:MaxBasisWidth", "type":"xsd:integer", "value":1396 },
                            { "name":"ns0000:BasisLength", "type":"xsd:integer", "value":1480 },
                            { "name":"ns0000:MinBasisLength", "type":"xsd:integer", "value":1480 },
                            { "name":"ns0000:MaxBasisLength", "type":"xsd:integer", "value":4877 }
                        ]
                },
                { "name": "ns0000:JAPANESE_POSTCARD", "item":
                        [
                            { "name":"ns0000:BasisWidth", "type":"xsd:integer", "value":1397 },
                            { "name":"ns0000:MinBasisWidth", "type":"xsd:integer", "value":1397 },
                            { "name":"ns0000:MaxBasisWidth", "type":"xsd:integer", "value":3302 },
                            { "name":"ns0000:BasisLength", "type":"xsd:integer", "value":1480 },
                            { "name":"ns0000:MinBasisLength", "type":"xsd:integer", "value":1480 },
                            { "name":"ns0000:MaxBasisLength", "type":"xsd:integer", "value":1819 }
                        ]
                },
                :
                :
                { "name": "ns0000:B5", "item":
                        [
                            { "name":"ns0000:BasisWidth", "type":"xsd:integer", "value":2100 },
                            { "name":"ns0000:MinBasisWidth", "type":"xsd:integer", "value":2100 },
                            { "name":"ns0000:MaxBasisWidth", "type":"xsd:integer", "value":2569 },
                            { "name":"ns0000:BasisLength", "type":"xsd:integer", "value":1820 },
                            { "name":"ns0000:MinBasisLength", "type":"xsd:integer", "value":1820 },
                            { "name":"ns0000:MaxBasisLength", "type":"xsd:integer", "value":2793 }
                        ]
                },
                :
                :
                { "name": "ns0000:13x19", "item":
                        [
                            { "name":"ns0000:BasisWidth", "type":"xsd:integer", "value":3201 },
                            { "name":"ns0000:MinBasisWidth", "type":"xsd:integer", "value":3201 },
                            { "name":"ns0000:MaxBasisWidth", "type":"xsd:integer", "value":3302 },
                            { "name":"ns0000:BasisLength", "type":"xsd:integer", "value":1820 },
                            { "name":"ns0000:MinBasisLength", "type":"xsd:integer", "value":1820 },
                            { "name":"ns0000:MaxBasisLength", "type":"xsd:integer", "value":2286 }
                        ]
                },
                { "name": "ns0000:8", "item":
                        [
                            { "name":"ns0000:BasisWidth", "type":"xsd:integer", "value":1000 },
                            { "name":"ns0000:MinBasisWidth", "type":"xsd:integer", "value":1000 },
                            { "name":"ns0000:MaxBasisWidth", "type":"xsd:integer", "value":3302 },
                            { "name":"ns0000:BasisLength", "type":"xsd:integer", "value":4878 },
                            { "name":"ns0000:MinBasisLength", "type":"xsd:integer", "value":4878 },
                            { "name":"ns0000:MaxBasisLength", "type":"xsd:integer", "value":7620 }
                        ]
                },
            ]
        }
</String>
</Properties>
```

FIG. 14

```
*%*********************************************************************
*%                  Duplex
*%*********************************************************************
*Feature: Duplex
{
        *rcNameID: =PAPER_SIZE_DISPLAY
        *DefaultOption: =Simplex
        *Option: Simplex
        {
                *rcNameID: =OFF_DISPLAY
        }
        *Option: LongEdge
        {
                *rcNameID: =ON_DISPLAY
        }
        *Option: ShortEdge
        {
                *rcNameID: =ON_DISPLAY
        }
}

*%*********************************************************************
*%                  Custom Paper Size
*%*********************************************************************
*Feature: CostomPaperSize
{
        *rcNameID: =USER_DEFINED_SIZE_DISPLAY
        *DefaultOption: =4_1
        *Option: 0_1
        {
                *MinSize: PAIR(1000, 1480)
                *MaxSize: PAIR(3302, 4877)
        }
        *Option: 0_2
        {
                *MinSize: PAIR(1397, 1480)
                *MaxSize: PAIR(3302, 1819)
                *BasePaperSize: =JAPANESE_POSTCARD
        }
        ⋮
        *Option: 3_1
        {
                *MinSize: PAIR(2100, 1820)
                *MaxSize: PAIR(2569, 2793)
                *BasePaperSize: =B5
        }
        *Option: 3_2
        {
                *MinSize: PAIR(2100, 2794)
                *MaxSize: PAIR(2569, 4320)
                *BasePaperSize: =B4
        }
        ⋮
        *Option: 7_1
        {
                *MinSize: PAIR(3201, 1820)
                *MaxSize: PAIR(3302, 2286)
                *BasePaperSize: =13x19
        }
        *Option: 8
        {
                *MinSize: PAIR(1000, 4878)
                *MaxSize: PAIR(3302, 7620)
        }
}

*InvalidCombination(CostomPaperSize.8, Duplex.LongEdge)
*InvalidCombination(CostomPaperSize.8, Duplex.ShortEdge)
```

FIG. 16

```xml
<?xml version="1.0">
<Feature name = "PageMediaSize">
<ns0000:MediaInformation>
        <ns0000:MediaParameter ns0000:Id="0">
                <ns0000:MediaId>65540</ns0000:MediaId>
                <ns0000:Name>User definition (thick paper)</ns0000:Name>
                <ns0000:Weight>164</ns0000:Weight>
                <ns0000:Surface>Normal</ns0000:Surface>
                <ns0000:Shape>Normal</ns0000:Shape>
                <ns0000:Color>White</ns0000:Color>
        </c:MediaParameter>
        <ns0000:MediaParameter ns0000:Id="1">
                <ns0000:MediaId>655363</ns0000:MediaId>
                <ns0000:Name>User definition (OHP)</ns0000:Name>
                <ns0000:Weight>165</ns0000:Weight>
                <ns0000:Surface>Film</ns0000:Surface>
                <ns0000:Shape>Normal</ns0000:Shape>
                <ns0000:Color>Clear</ns0000:Color>
        </c:MediaParameter>
        <ns0000:MediaParameter ns0000:Id="2">
                <ns0000:MediaId>65544</ns0000:MediaId>
                <ns0000:Name>User definition (normal paper)</ns0000:Name>
                <ns0000:Weight>64</ns0000:Weight>
                <ns0000:Surface>Normal</ns0000:Surface>
                <ns0000:Shape>Normal</ns0000:Shape>
                <ns0000:Color>White</ns0000:Color>
        </c:MediaParameter>
</ns0000:MediaInformation>
</xml>
```

FIG. 17

```
*%*********************************************************************
*%                    MediaType
*%*********************************************************************
*Feature: MediaType
{
        *rcNameID: =IDS_PAGEMEDIATYPE
        *ConflictPriority: 8000
        *DefaultOption: NONE
        *Option: NONE
        {
                *rcNameID: =IDS_PAGEMEDIATYPE_NONE
                *PrintSchemaKeywordMap: "None"
        }
        *Option: STANDARD
        {
                *rcNameID: =IDS_PAGEMEDIATYPE_PLAIN
                *PrintSchemaKeywordMap: "Plain"
*Ifdef: EXTENSION_CONSTRAINTS
                *weight: =64
                *surface: "Normal"
                *shape: "Normal"
                *color: "white"
*Endif: *% EXTENSION_CONSTRAINTS
        }
        *Option: TRANSPARENCY
        {
                *rcNameID: =IDS_PAGEMEDIATYPE_TRANSPARENCY
                *PrintSchemaKeywordMap: "Transparency"
*Ifdef: EXTENSION_CONSTRAINTS
                *weight: =165
                *surface: "Film"
                *shape: "Normal"
                *color: "Clear"
*Endif: *% EXTENSION_CONSTRAINTS
        }
        *Option: THIN
        {
                *rcNameID: =IDS_PAGEMEDIATYPE_THIN
*Ifdef: EXTENSION_CONSTRAINTS
                *weight: =164
                *surface: "Normal"
                *shape: "Normal"
                *color: "White"
*Endif: *% EXTENSION_CONSTRAINTS
        }
}
```

INFORMATION PROCESSING APPARATUS, METHOD AND STORAGE MEDIUM PERFORMING PROHIBITION PROCESSING FOR PRINT SETTINGS

BACKGROUND OF THE INVENTION

Field of the Invention

The present invention relates to an information processing apparatus, a control method of the information processing apparatus, and a storage medium, and more particularly, to a printing system which controls arbitrary printing setting set by a user in a printer driver.

Description of the Related Art

In Windows (registered trademark) 8.1 and the like of Microsoft (registered trademark), a printer driver operated by a new architecture which is referred to as a V4 printer driver was introduced. The V4 printer driver is an architecture which succeeds XML Paper Specification (XPS) provided as an architecture of a V3 printer driver. Moreover, the V4 printer driver uses a print path using an XPS document.

In the XPS print path, print function information which is referred to as Print Capabilities and is described in an XML format and print setting information which is referred to as Print Ticket and is described in the XML format are used to decide an appearance of printed matter. The V4 printer driver includes a print setting definition file referred to as Generic Printer Description (GPD). It is possible to provide a user with a print setting change function using Print Capabilities and Print Ticket by installing a printer driver including the GPD in an operating system (OS).

The print setting change function includes a function referred to as "prohibition" which controls print settings that cannot be executed at the same time by a device. For example, in the case of a printer driver corresponding to a device which cannot perform "two-sided printing" on a sheet size of "postcard," the printer driver needs to perform control such that a user does not set these settings at the same time. A standard print setting User Interface (UI) provided by an OS can execute prohibition processing by describing a definition of the "prohibition" in a GPD file.

In recent years, a function on a device side has become complicated, and thereby prohibition processing of a printer driver has also become complicated. Since the past, it has been possible to perform printing in a "user-defined size" in which a user arbitrarily sets a width and a height of a sheet size (for example, refer to Japanese Patent Laid-Open No. 2004-326040).

A V4 printer driver can display a conventional print setting UI for an individual desktop prepared by an individual vendor in addition to a standard print setting UI provided by an OS. Furthermore, a print setting UI exclusive for a touch panel environment which is referred to as "start screen" installed in OSs after Windows (registered trademark) 8 that is easily operated by touch can also display an individual vendor's UI. Since the print setting UI for a desktop described above has the same print settings as the print setting UI exclusive for a touch panel environment, it is desirable to commonalize the print setting UIs as much as possible in individual prohibition processing. Originally, since the V4 printer driver defines prohibition information in a GPD file, both of the UIs perform prohibition processing using the prohibition information. Accordingly, prohibition processing is unified in each of the UIs.

However, in Japanese Patent Laid-Open No. 2004-326040, in the "user-defined size", "two-sided printing" is possible at a specific width and height, but this may not be possible in other sizes in some cases. In order for a user to reliably perform the printing, it is necessary to perform prohibition processing of "two-sided printing" in accordance with a width and a height of a sheet size set by a user in a print setting UI of a printer driver.

In addition, a standard format of prohibition described in the GPD file provided by an OS cannot follow the recent complexity of prohibition processing. As described above, prohibition information by which a certain function cannot be used according to a width and a height of a sheet size even in the same "user-defined size" cannot be defined. As a result, for example, even if two-sided printing can be set in a print setting UI according to a width and a height of a user-defined size set by a user, there are some cases in which two-sided printing is not possible as a result of printing.

SUMMARY OF THE INVENTION

The present invention provides a printing system in which appropriate printing can be performed by performing prohibition processing on print settings such as a sheet size arbitrarily set by a user.

According to the invention, an information processing apparatus is provided that includes a determination unit configured to determine whether or not a sheet size included in print settings is a user-defined size; a decision unit configured to decide a fixed size as a sheet size used for prohibition processing based on a width and a height of the user-defined size if the determination unit determines that the sheet size included in the print settings is the user-defined size; a storage unit configured to store the user-defined size set as the sheet size in the print settings; a changing unit configured to change the sheet size in the print settings from the user-defined size to the fixed size decided by the decision unit; and a prohibition processing unit configured to perform the prohibition processing for the print settings changed by the changing unit, wherein the changing unit returns the sheet size of the print settings in which the prohibition processing is performed to the user-defined size stored by the storage unit from the fixed size decided by the decision unit.

According to the invention, it is possible to provide a printing system in which appropriate printing can be performed by performing prohibition processing on print settings such as a sheet size and the like arbitrarily set by a user. Accordingly, appropriate prohibition processing is performed for each size of a width and a height of a user-defined size to enable a user to grasp whether each function is possible according to the arbitrary width and height of a user-defined size in the V4 printer driver.

Further features of the invention will become apparent from the following description of exemplary embodiments with reference to the attached drawings.

BRIEF DESCRIPTION OF THE DRAWINGS

FIG. 4 is a flowchart illustrating prohibition processing.

FIG. 5 is a matrix view of categorization of a user-defined size.

FIG. 6 is a table illustrating an example of the categorization of a user-defined size.

FIG. 8 is a diagram illustrating an example of a description of a GPD file.

FIG. 9 is a diagram illustrating an example of a description of a DriverPropertyBag.

FIG. 10 is a diagram illustrating an example of a description of a GPD file according to a second embodiment.

FIG. 11 is a diagram illustrating an example of categorization of a user-defined size.

FIG. 13 is a diagram illustrating an example of a description of a DriverPropertyBag.

FIG. 14 is a diagram illustrating an example of a description of a GPD file according to a fourth embodiment.

FIG. 16 is a diagram illustrating an example of a description of a QueuePropertyBag according to the fifth embodiment.

FIG. 17 is a diagram illustrating an example of a description of a DriverPropertyBag.

DESCRIPTION OF THE EMBODIMENTS

Hereinafter, preferred embodiments of the invention will be described with reference to the drawings.
(First Embodiment)

Figure 1:
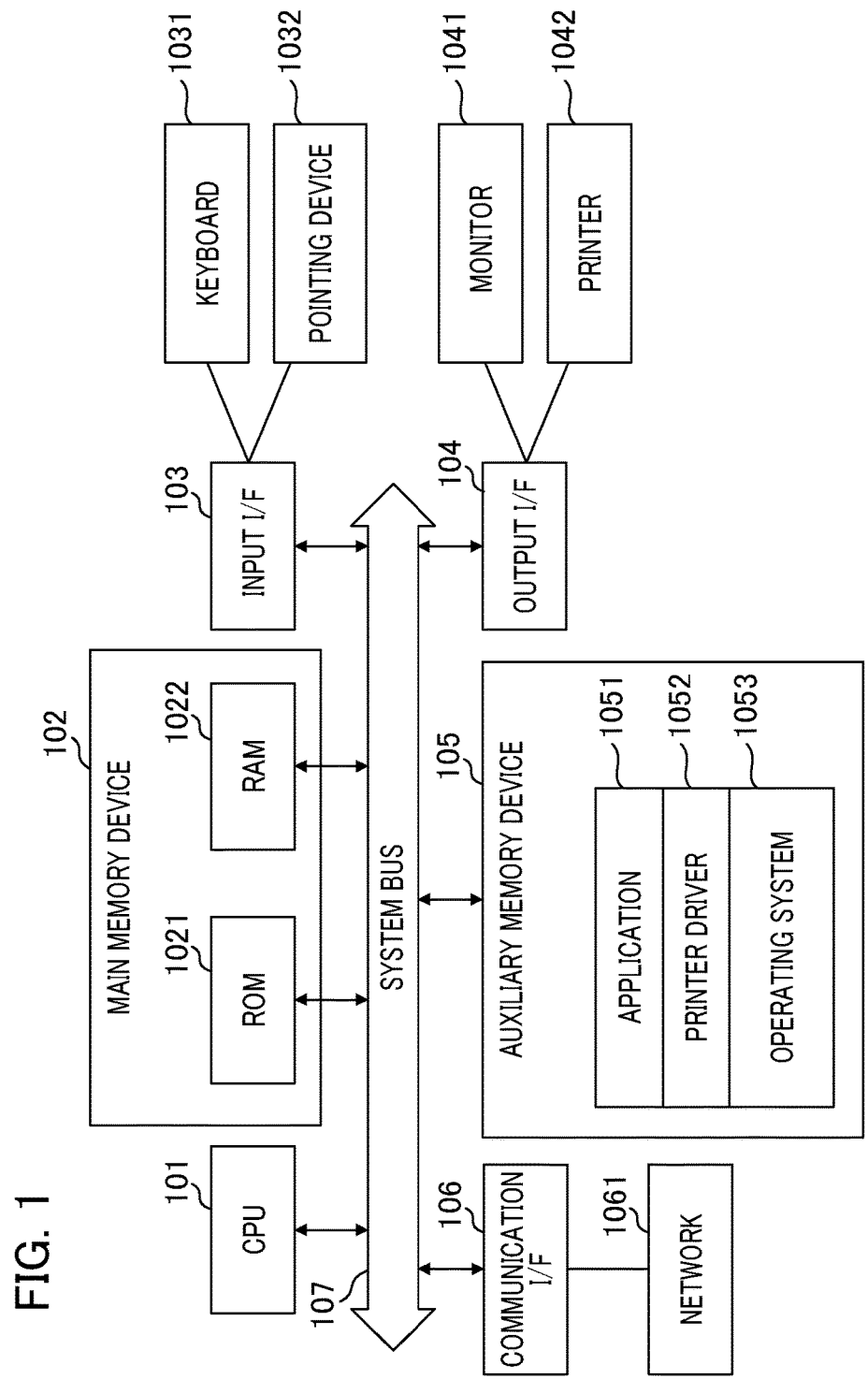
FIG. 1 is a block diagram of a printing system using a general computer.

FIG. 1 shows a block diagram of a printing system which uses a general computer according to the embodiment. A CPU 101 controls an entire device according to a program stored in a ROM 1021 or a RAM 1022 of a main memory device 102 or an auxiliary memory device 105. The RAM 1022 is also used as a work area if the CPU 101 performs various types of processing. Each component in the embodiment is read by the RAM 1022 to be processed.

An auxiliary memory device 105 records an application 1051, a printer driver 1052, an operating system (OS) 1053, and the like. The printer driver 1052 performs a printing instruction on a device having a printing function. Input devices such as a keyboard 1031 and a pointing device 1032 represented by a mouse, a touch panel, and the like are devices for a user to give various types of instructions to a computer through an input I/F 103. An output I/F 104 is an interface for outputting data to the outside, and outputs data to an output device such as a monitor 1041, a printer 1042, or the like. The output I/F 104 may be connected not only through a local I/O directly connected to the printer 1042, but also through a network 1061 connected through a communication I/F 106. Moreover, a common data system 107 performs data exchange between each I/F and a module.

Figure 2:
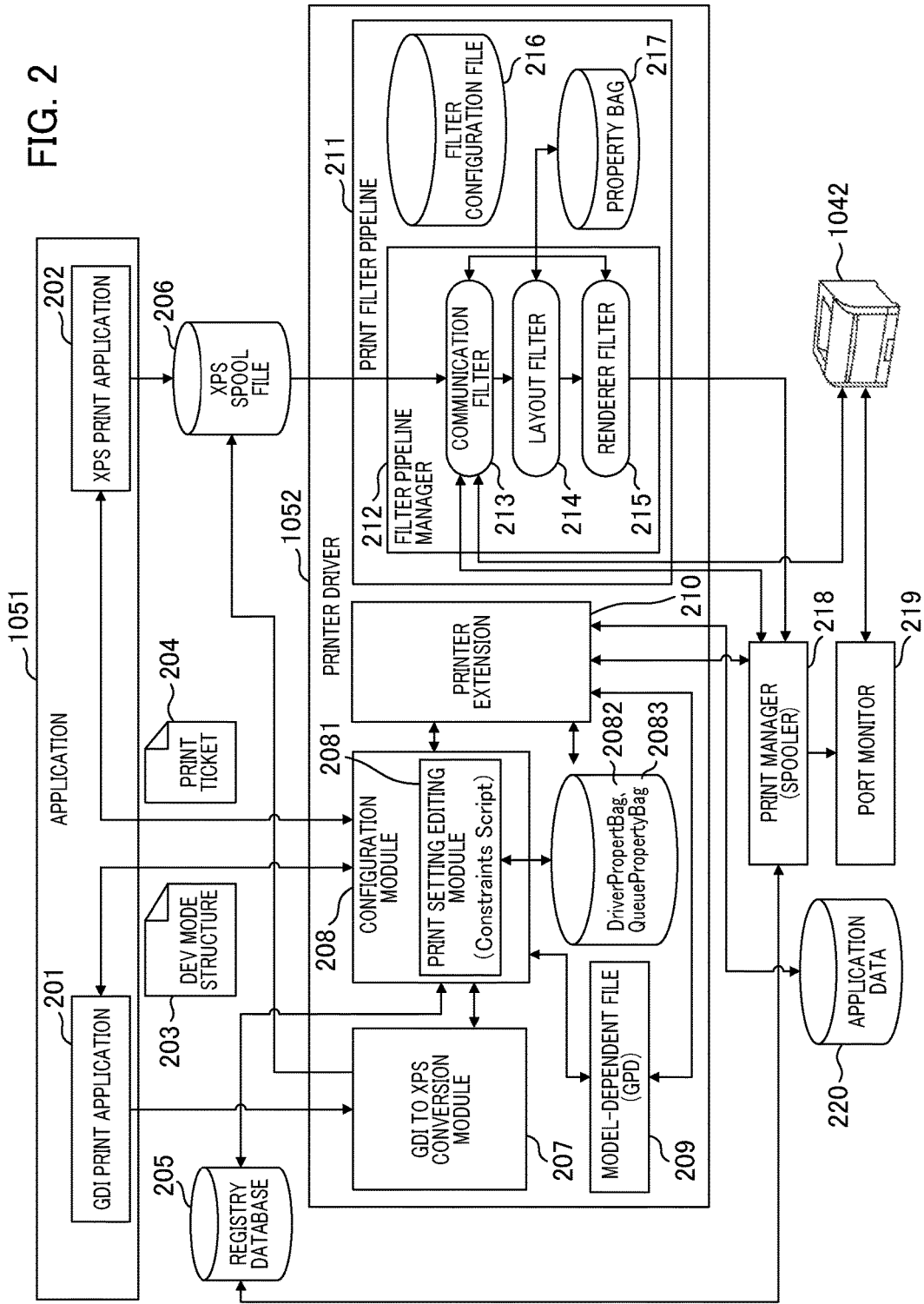
FIG. 2 is a block diagram of a driver printing system.

FIG. 2 is a view which shows a block diagram of a driver printing system according to the embodiment. The driver printing system according to the embodiment is a system which uses an XPS file format as spool data to perform printing. The driver printing system operates on an operating system 1053. The operating system 1053 includes a print manager (spooler) 218, a GDI to XPS conversion module 207, a filter pipeline manager 212, and a port monitor 219. Here, GDI is a graphic component which generates a print image for a printer, and the GDI to XPS conversion module 207 has a function of converting data drawn in GDI into XPS data. The filter pipeline manager 212 is a module for managing filter print processing which is a feature of the XPS print path.

The port monitor 219 can control communication between the print manager 218 to access a device and a printer driver, and the printer driver performs print processing via the port monitor 219. The printer driver 1052 includes a GDI to XPS conversion module 207, a configuration module 208, and a filter pipeline manager 212. In this embodiment, the printer driver 1052 is positioned as a module provided from the operating system 1053. The configuration module 208 can use a print setting editing module 2081 provided by the printer driver to edit print setting information. The print setting editing module 2081 is described in a script language referred to as Constraint Script. In addition, the print setting editing module 2081 edits print setting information using a DriverPropertyBag 2082 and a QueuePropertyBag 2083 provided by the printer driver. Here, the DriverPropertyBag 2082 is a data group to be used as model-dependent information of a printer, and the QueuePropertyBag 2083 refers to a region in which a data group in a print queue is held.

The DriverPropertyBag 2082 is model-dependent data of a printer present in a driver package, and a data group is held as read-only in a specific region in the OS 1053 after printer driver installation. The QueuePropertyBag 2083 can be used by registering an xml definition file of a Key-Value pair in the OS 1053, and can edit a value with constant authority. In addition, it is possible to describe a definition of the QueuePropertyBag 2083 even in GPD which is a print setting definition file. The printer driver 1052 and each filter of the filter pipeline manager 212 are stored as the printer driver 1052 in the auxiliary memory device 105 shown in FIG. 1. A GDI print application 201 and an XPS print application 202 are stored as an application 1051 in the auxiliary memory device 105 shown in FIG. 1. A user uses an input device such as a keyboard 1031 or a pointing device 1032 represented by a touch panel, a mouse, and the like to perform printing from the application 1051 projected on the monitor 1041 of an output device. The application refers to the GDI print application 201 (hereinafter abbreviated as GDI application) or the XPS print application 202 (hereinafter abbreviated as XPS application). Print processing is performed by performing three types of processing of selecting a printer, creating print settings, and converting drawing data in sequence.

First, a printer 1042 to perform printing is selected. If viewed by a user, a selection of the printer 1042 is the same as a selection of the printer driver 1052 corresponding to the printer 1042 which performs printing. A print queue which is not shown is used in selecting the printer driver 1052. Next, print settings are created. For the print settings, the application 1051 first secures a memory region for the print settings in the RAM 1022. Then, the application 1051 invokes the configuration module 208 of the printer driver 1052, and creates and stores print setting data. The application 1051 can designate a user-defined size as print setting data. The GDI application 201 uses a binary DEVMODE structure 203 as print setting data, and the XPS application 202 uses a Print Ticket 204 described in XML of a markup language. The DEVMODE structure 203 has a standard region defined by the operating system 1053 and an extended region independently defined by the printer driver 1052. The Print Ticket 204 is print setting information described in an XML format, and the standard region and the extended region are separately described in namespaces.

In addition, since the print setting data include model-specific information, the configuration module 208 uses the model-dependent file 209 to create the print setting data. The DEVMODE structure 203 or the Print Ticket 204 holds print settings, and the application 1051 directly rewrites a value to change the print settings. The model-dependent file 209 refers to a print setting definition file referred to as GPD, and is described in a text-based manner as shown in FIG. 8 to be described below. Furthermore, it is possible to describe a definition of "prohibition" in the model-dependent file 209. If a user changes print settings, and thereby there is an invalid combination described in GPD, the printer driver 1052 changes settings in a forced manner such that a function with a lowest priority is not used in accordance with the defined prohibition. In this manner, change processing in settings to eliminate an invalid combination performed if the invalid combination of print settings is designated is referred to as prohibition processing. For example, information on print settings which cannot be set at the same time is described in an item of InvalidCombination based on a description method defined by Microsoft (registered trademark), and thereby a prohibition function is provided to a user. Here, the print settings which cannot be set at the same time by a user include not only an item which cannot be provided as a function of the device 1032 but also an item which is not intentionally used by a user. The printer driver 1052 includes two types of means: means for realizing "prohibition" using the means described above and means for realizing "prohibition" using the print setting editing module 2081. In the embodiment, prohibition realized using InvalidCombination of GPD is described. A printer extension 210 has a function of changing print settings through a print setting screen shown in FIG. 3 to be described below. In addition, the printer extension 210 is executed by the CPU 101 as an application for print settings associated with the printer driver 1052.

Figure 3:
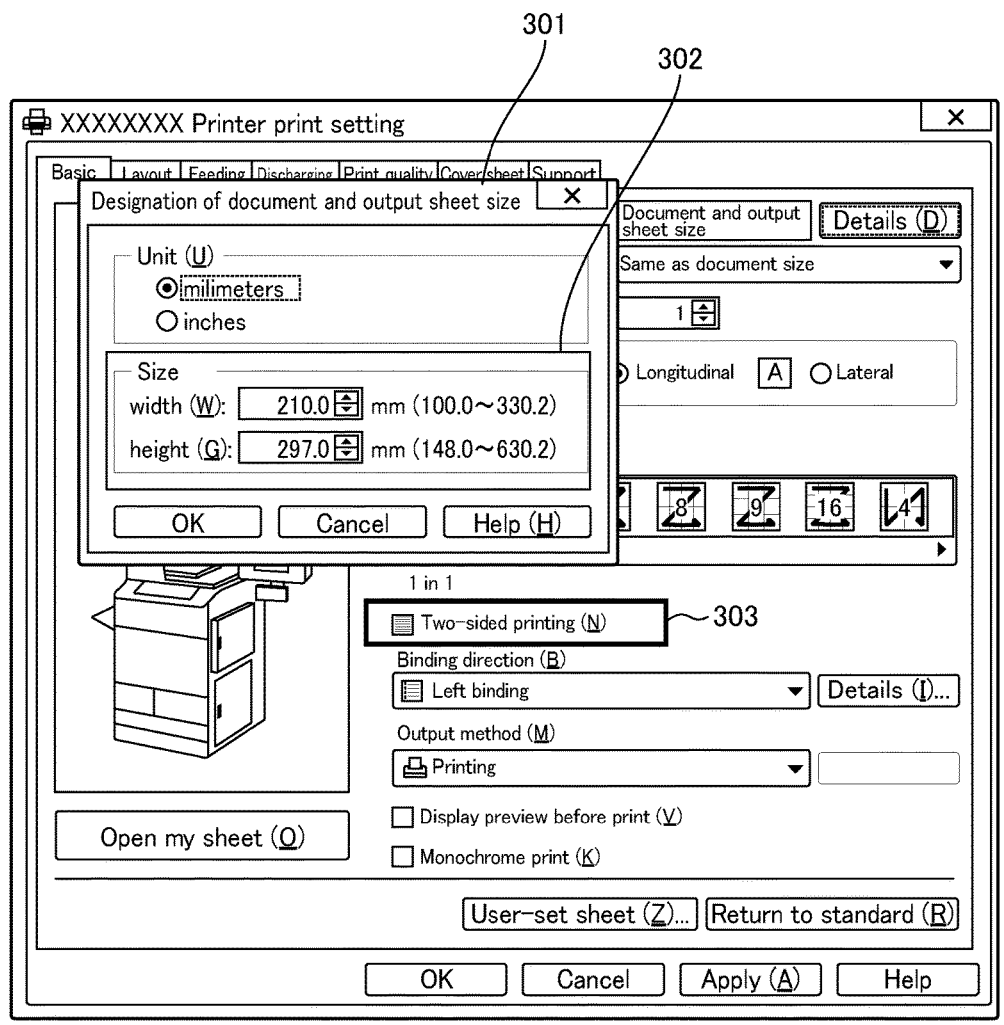
FIG. 3 is a diagram illustrating an example of a setting screen controlled by a printer extension.

FIG. 3 is a diagram illustrating an example of a setting screen (display unit) controlled by the printer extension 210 according to the embodiment. In the embodiment, a user first selects "document/output sheet size designation" for a document size as a method of setting a user-defined size. In a details dialog box 301 of the "document/output sheet size designation" displayed next, a user-defined size can be set by inputting a desired size into a width and a height 302 of size. If a user-defined size is set by a user, the printer extension 210 acquires the width and the height of the sheet size, and determines a function which cannot be used to perform prohibition thereon. For example, according to the width and the height of the set user-defined size, a two-sided printing function which cannot be used may be prohibited, and "two-sided printing" 303 of a print setting screen may be checked off and grayed out to prevent it from being set.

FIG. 4 is a flowchart illustrating prohibition processing according to the embodiment. Unless particularly specified, the embodiment is processing performed by the printer extension 210. The printer extension 210 is loaded into the RAM 1022 and is executed by the CPU 101.

First, print settings are acquired (step S301). As a method of acquiring print settings according to prohibition processing, print settings may generally be given as parameters if called for by the configuration module 208. Then, information on a sheet size is acquired from the acquired print settings (step S302). From the acquired information on a sheet size, it is determined whether the sheet size is a fixed size defined by a driver or a user-defined size in which a user sets a width and a height of the sheet size (step S303). As a determination method, for example, it is determined whether or not a set value of the sheet size is an exclusive value for "user-defined size." In addition, it may be determined whether the set value of the sheet size is a value other than the fixed size defined by a driver or not. The user-defined size is designated by the application 1051 as described above or by a setting screen controlled by the printer extension 210, and is passed to the printer extension 210 as a part of the print settings in step S301. As a result of the determination, if the sheet size is a "user-defined size" (Yes), a user-defined size table is acquired from the DriverPropertyBag 2082 (step S304). Here, the user-defined size table is a conversion table in which categorization is performed according to sizes of a width and a height of a sheet size supported by the device 1032. The details will be described below. The user-defined size table is acquired and a category of a corresponding user-defined size is decided by a width and a height of the user-defined size acquired from the print settings (step S305). Next, the decided category of the user-defined size is reset in the print settings (step S306), and prohibition processing of GPD is performed using the print settings (step S307).

Next, the user-defined size table (sheet size table) will be described. FIG. 5 is a diagram illustrating an example of a matrix of categorization of a user-defined size according to the embodiment. In the embodiment, categorization from an unfixed form 0-1 to an unfixed form 8 is performed according to sizes in a width direction and in a feeding direction of a sheet size, and a support state of a print function for each category is shown. For example, if a width of the sheet size is between 100.0 and 330.2 (unit: mm) and a height thereof is between 487.8 and 762.0 (unit: mm), a category of an unfixed size is an "unfixed form 8," and two-sided printing is not supported with the "unfixed form 8." An user-defined size table show in FIG. 6 is a table of a list of the matrix view. From the table shown in FIG. 6, for example, it is known that a punch is not supported with an "unfixed form 3-3," but a staple is supported.

Figure 7:
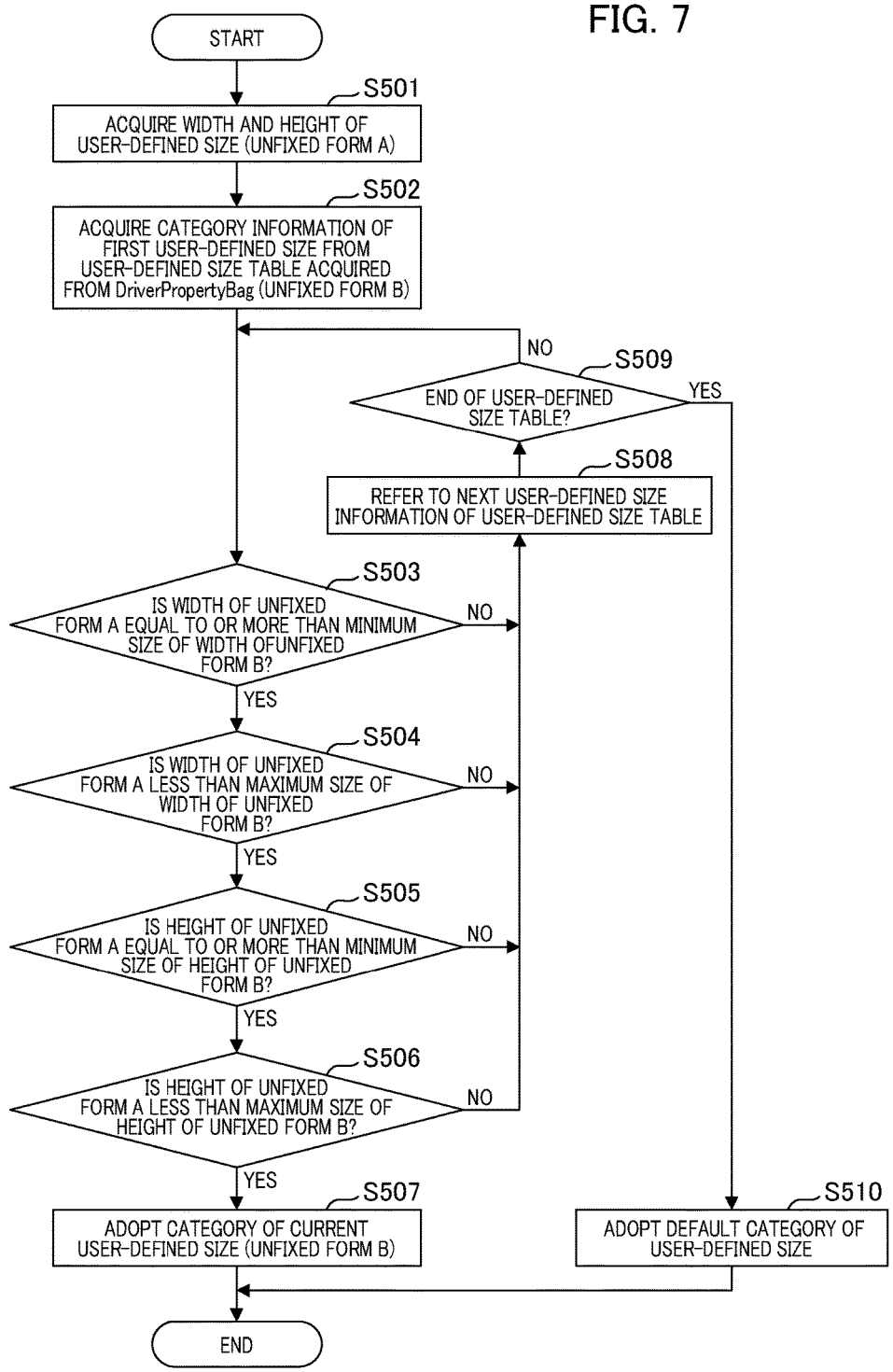
FIG. 7 is a flowchart of processing for acquiring a category of a user-defined size.

FIG. 7 is a flowchart of processing for deciding a category of a user-defined size according to the embodiment. The processing is a detailed description of processing (step S305) of acquiring the user-defined size table shown in FIG. 6 and deciding a category of a corresponding user-defined size based on a width and a height of the user-defined size acquired from print settings.

First, information on a width and a height of a user-defined size is acquired from the information on a sheet size acquired in step S302 of FIG. 4 (step S501). The user-defined size is set to be an "unfixed form A" for convenience. In addition, category information on a first user-defined size is acquired from the user-defined size table acquired in step S304 of FIG. 4 (step S502). A user-defined size of a currently acquired category is set to be an "unfixed form B" for convenience. Accordingly, processing of checking to which category a sheet size of the unfixed form A belongs is performed.

Next, it is determined whether a width of the unfixed form A is equal to or more than a minimum size of a width of the unfixed form B (step S503). If the width of the unfixed form A is equal to or more than the minimum size of the width of the unfixed form B (Yes), processing proceeds to step S504, and if the width of the unfixed form A is less than the minimum size of the width of the unfixed form B (No), the processing proceeds to step S508.

Next, it is determined whether the width of the unfixed form A is less than a maximum size of the width of the unfixed form B (step S504). If the width of the unfixed form A is less than the maximum size of the width of the unfixed form B (Yes), the processing proceeds to step S505, and if the width of the unfixed form A is equal to or more than the maximum size of the width of the unfixed form B (No), the processing proceeds to step S508.

Next, it is determined whether a height of the unfixed form A is equal to or more than a minimum size of a height of the unfixed form B (step S505). If the height of the unfixed form A is equal to or more than the minimum size of a height of the unfixed form B (Yes), the processing proceeds to step S506, and if the height of the unfixed form A is less than the minimum size of the height of the unfixed form B (No), the processing proceeds to step S508.

Then, it is determined whether the height of the unfixed form A is less than a maximum size of the height of the unfixed form B (step S506). If the height of the unfixed form A is less than the maximum size of the height of the unfixed form B (Yes), the processing proceeds to step S507 and a category of a user-defined size is adopted (step S507). On the other hand, if the height of the unfixed form A is equal to or more than the maximum size of the height of the unfixed form B (No), the processing proceeds to step S508.

Then, information on a user-defined size in a next category of the user-defined size table is referred (step S508). Next, it is determined whether all categories are referred to (step S509). That is, it is determined whether there is a next category of the user-defined size table. If there is no next category of the user-defined size table and all categories are referred to (Yes), the processing adopts a default category of a user-defined size (step S510). On the other hand, if there is a next category of the user-defined size table (No), the processing returns to step S503 to execute processing again.

FIG. 8 is a diagram illustrating an example of a description of a GPD file according to the embodiment. First, "CostomPaperSize" 501 is defined in "Feature." Then, options corresponding to categories described in FIG. 6 are defined. In the embodiment, for example, an "unfixed form 8" shown in the category of FIG. 6 becomes "Option: 8" 502 in the GPD file. In addition, information which defines prohibition processing means that the "unfixed form 8" and "two-sided printing (long-side binding and short-side binding)" cannot be set at the same time as shown in "Invalid-Combination" 503.

FIG. 9 is a diagram illustrating an example of a description of a DriverPropertyBag 2082 according to the embodiment. In the DriverPropertyBag 2082, maximum and minimum values and a default value of each of a width and a height of a sheet size are described. For example, if a sheet size of a user-defined size satisfies a following condition, a category of an unfixed size is ""name":"ns0000:8"" 601. That is, the category becomes the unfixed form 8 in which "name" is "ns0000:8." A minimum value of a width (MinBasisWidth 602) is between 100.0 and a maximum value (MaxBasisWidth 603) 330.2 (unit: mm). A minimum value of a height (MinBasisLength 604) is between 487.8 and a maximum value (MaxBasisLength 605) 762.0 (unit: mm).

In this manner, a category uniquely decided from arbitrary settings in the DriverPropertyBag 2082 is converted into Option and prohibition processing of the GPD file is referred to, and thereby prohibition using a standard format of the OS in any number is performed. As a result, a user is allowed to know in advance a support function according to each size of a user-defined size using a printer driver.

(Second Embodiment)

In the first embodiment, it is possible to perform prohibition processing in accordance with an option of each category by performing categorization according to a size of a "user-defined size." However, describing prohibition processing of all categories would be an enormous amount of description. Since the maximum number of lines of prohibition processing ensured by the OS 1053 is about 10000 lines, an upper limit is reached soon, and thus it is not possible to describe all prohibition processing.

In the embodiment, the OS 1053 correctly operates and it is possible to describe all prohibition processing without reducing prohibition information. FIG. 10 is a diagram illustrating an example of a GPD file according to the embodiment. As shown in FIG. 10, "Feature" of "Custom Paper Size" is interposed between "#Ifdef:" 701 and "#Endif:" 702.

In such a description, only the printer extension 210 can be referred to and the OS 1053 cannot be referred to. As a result, it is possible to suppress prohibition processing ensured by the OS 1053 from being enormous.

(Third Embodiment)

In the first embodiment, categorization is performed in accordance with a size of a "user-defined size," and thereby it is possible to perform prohibition processing according to an Option of each category. However, describing prohibition processing of all categories would be an enormous amount of description. Since the maximum number of lines of prohibition processing ensured by the OS 1053 is about 10000 lines, an upper limit is reached soon, and thus it is not possible to describe all prohibition processing.

Here, it is possible to describe all of prohibition processing by reducing an Option of a category and by reducing the number of lines of prohibition processing in the embodiment. Specifically, as shown in FIG. 11, if there are fixed sheet sizes which have similar support functions in each category, prohibition is performed in the fixed sheet sizes. In FIG. 11, if a category is an "unfixed form 0-2," "two-sided printing" is possible and "punch"/"staple" is not possible. Accordingly, a replacement option becomes "JAPANESE_POSTCARD" which is a fixed sheet size. In the same manner, an "unfixed form 3-1" is replaced with "B5," and an "unfixed form 7-1" is replaced with "13×19," which are fixed sheet sizes, respectively.

Figure 12:
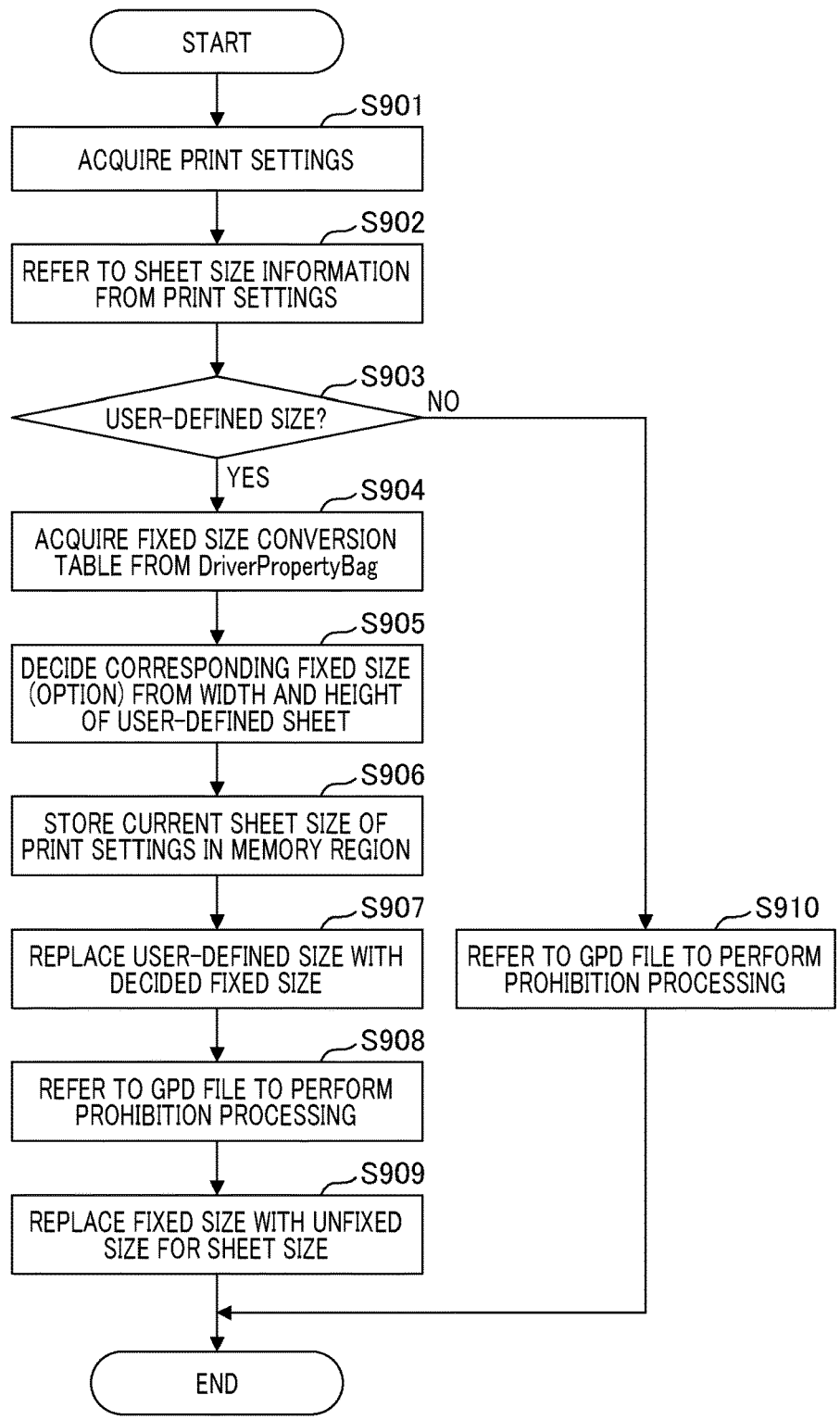
FIG. 12 is a flowchart illustrating prohibition processing according to a third embodiment.

FIG. 12 is a flowchart illustrating prohibition processing according to the embodiment. Unless particularly specified, the processing is processing performed by the printer extension 210. The printer extension 210 is loaded into the RAM 1022, and is executed by the CPU 101. Since steps S901 to S903 have the same processing as steps S301 to S303 shown in FIG. 3, detailed description thereof will be omitted.

As a result of step S903, if a sheet size is a "user-defined size" (Yes), a fixed size conversion table is acquired from the DriverPropertyBag 2082 (step S904). Here, the fixed size conversion table is a table for converting a width and a height of a user-defined size into a fixed size (A4, Letter, B5, JAPANESE_POSTCARD, and the like) supported by the device 1032.

Next, the printer extension 210 decides a corresponding fixed size (Option) on the fixed size conversion table based on a width and a height of a user-defined size set in print settings acquired in step S901 (step S905). Accordingly, a fixed size is decided as a sheet size to be used in prohibition processing based on a width and a height of a user-defined size. Next, information (Option) on a user-defined size set in the print settings is stored in a memory region (step S906). Here, the stored information on a user-defined size includes information on a paper ID, a width, and a height. Then, the print settings are changed by replacing the information on a user-defined size with the information on a fixed size decided in step S905 for information on a sheet size set in the print settings (step S907). Accordingly, print settings in which a paper ID, a width, and a height of a user-defined size are set are changed to print settings in which a paper ID, a width, and a height of a fixed size are set.

Next, prohibition processing of GPD is performed using print settings which are reset in step S907 (step S908). If the change in the print settings of step S907 is not returned to an original state after prohibition processing of GPD is completed, a designated user-defined size is ignored and printing is performed in a fixed size. Therefore, in step S909 to be described next, a sheet size is returned to an original size by performing processing opposite to that of step S907. Specifically, information (information on a fixed size) on a sheet size in the print settings set in step S907 is replaced with information on a user-defined size stored in the memory region in step S906 to reset the print settings (step S909), and then processing is completed. As a result, print settings in which a paper ID, a width, and a height of a fixed size are set are returned to original print settings in which a paper ID, a width, and a height of a user-defined size are set. Next, if a sheet size in step S903 is not a user-defined size (No), prohibition processing of GPD is performed using the set print settings (step S910). Then, processing is completed.

FIG. 13 is a diagram illustrating an example of a description of a DriverPropertyBag 2082 according to the embodiment. FIG. 13 is different from FIG. 9 in that a category to be prohibition-processed in the same manner as a fixed size is made to be a corresponding fixed size as described above. In this manner, it is possible to reduce an Option of a category of a user-defined size according to the embodiment, and as a result, it is possible to suppress prohibition processing from being enormous.

(Fourth Embodiment)

In the first embodiment, prohibition processing is performed according to a width and a height of a sheet size of a "user-defined size" only if a print setting screen is started. However, if printing is executed without starting the print setting screen, prohibition processing is not performed, and thereby printing data is transmitted to a device 1032 side.

Therefore, in the embodiment, a description method of a GPD file is extended so that the OS 1053 sets an Option according to a width/a height of a sheet size of a "user-defined size." FIG. 14 is a diagram illustrating an example of a description of a GPD file according to the embodiment. In the embodiment, a minimum size and a maximum size of a sheet size are added to each Option. The OS 1053 decides an Option of a category of an unfixed form from "MinSize" and "MaxSize" if a sheet size is a "user-defined size." Furthermore, if a fixed size similar to Base Paper Size is defined in the category, prohibition processing is performed in the fixed size.

As described above, according to the embodiment, a minimum size and a maximum size of a sheet size, and furthermore a fixed size which is Base can be defined in a GPD file, and thereby it is possible to perform prohibition processing in settings with any number only by referring to the GPD file.

(Fifth Embodiment)

In the first embodiment, it is possible to perform categorization based on a size of a "user-defined size" and to perform prohibition processing in accordance with an Option of each category. However, in addition to a "user-defined size," there is a sheet type (or paper type) as a print setting which can be arbitrarily set by a user. In this case, unlike a user-defined size, a driver communicates with the device 1032 to acquire information on a sheet type registered on the device 1032 side. Accordingly, a user can arbitrarily set print settings by registering information in the device 1032, such that prohibition information cannot be described in a GPD file. As a result, it is not possible to perform prohibition processing on these sheet types.

Figure 15:
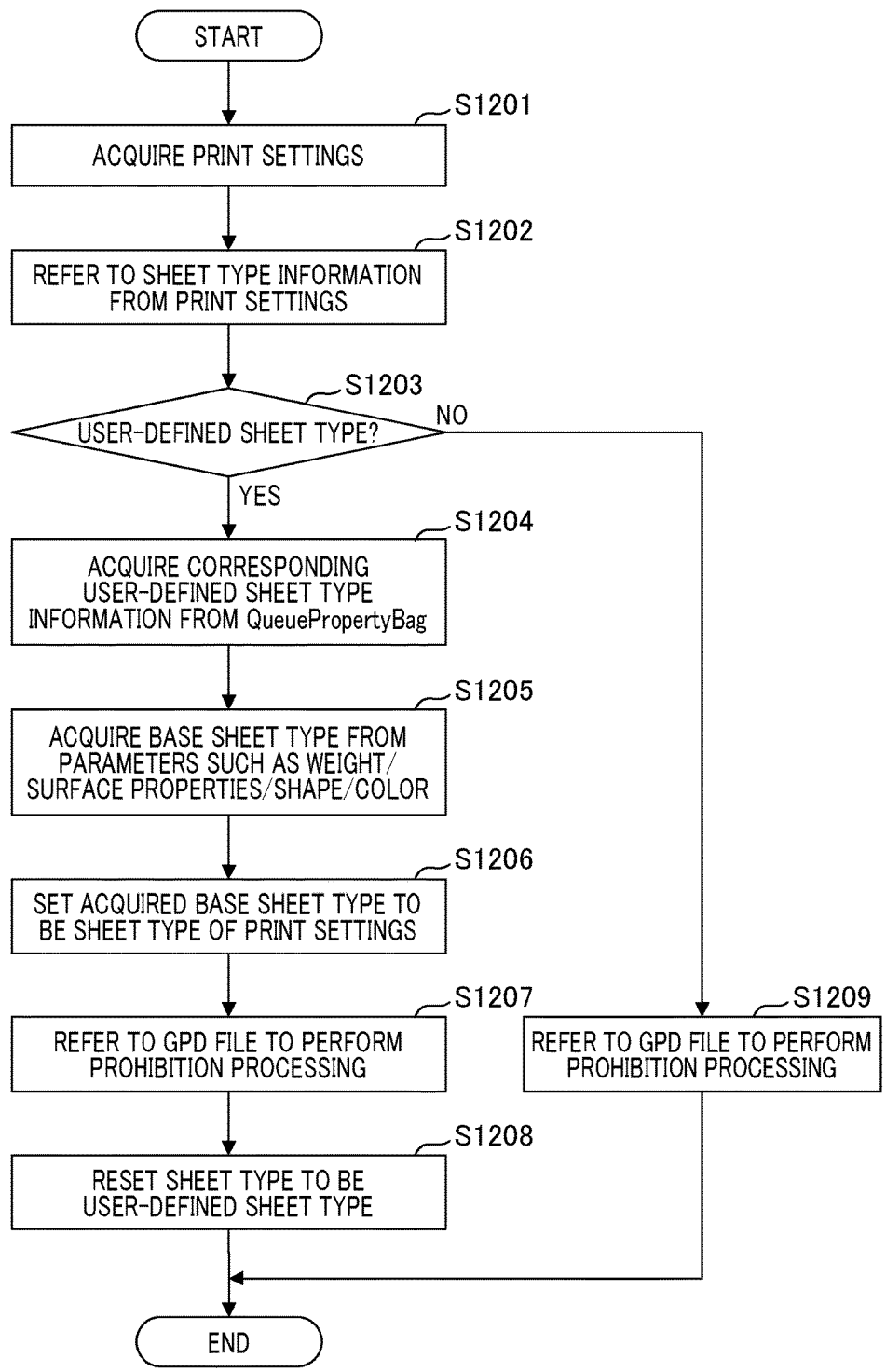
FIG. 15 is a flowchart illustrating prohibition processing according to a fifth embodiment.

Therefore, prohibition processing can be correctly performed on a sheet type arbitrarily set by a user in the embodiment. FIG. 15 is a flowchart illustrating prohibition processing according to the embodiment. Unless particularly specified, the processing is processing performed by the printer extension 210. The printer extension 210 is loaded into RAM 1022, and is executed by the CPU 101.

First, print settings are acquired (step S1201). Information on a sheet type is acquired from the acquired print settings (step S1202). It is determined whether the sheet type is a sheet type registered in the device 1032 (step S1203). If the sheet type is a user-registered sheet type (Yes), corresponding sheet type information registered by a user is acquired from a QueuePropertyBag 2083 (step S1204). Next, a sheet type of a base which accords with a weight/surface properties/shape/color of the acquired sheet type is acquired using a table of a DriverPropertyBag 2082 (step S1205). Then, the acquired sheet type of a base is set to be a parameter of a sheet type of print settings (step S1206) to perform prohibition processing referring to the GPD file (step S1207). Then, if prohibition processing is completed, the sheet type is reset to be a sheet type originally registered by a user (step S1208). On the other hand, if the sheet type in step S1203 is not a user-registered sheet type (No), prohibition processing is performed referring to the GPD file in print settings as it is (step S1209).

FIG. 16 is a diagram illustrating an example of a QueuePropertyBag 2083 according to the embodiment. Information on a sheet type stored in the QueuePropertyBag 2083 and information of a user-registered sheet type registered in the device 1032 are acquired and stored by a driver. In the embodiment, information on a name and weight (weight)/surface properties (surface)/shape (shape)/color (color) of each sheet type are stored.

FIG. 17 is a diagram illustrating an example of a DriverPropertyBag 2082 according to the embodiment. In the same manner as the information on the sheet type stored in the QueuePropertyBag 2083, information on a sheet type of a base describes information on a name and weight (weight)/surface properties (surface)/shape (shape)/color (color) of a sheet type.

In this manner, the prohibition processing is performed by converting a sheet type into the sheet type of the base based on each piece of information on a sheet type, and thereby correct prohibition processing is performed even on a user-defined sheet type registered in a device.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-015925, filed Jan. 29, 2015, No. 2015-221945, filed Nov. 12, 2015 which are hereby incorporated by reference wherein in their entirety.

What is claimed is:

1. An information processing apparatus configured to communicate with a printer, the apparatus comprising:
at least one processor and at least one memory functioning as:
a determination unit configured to determine whether or not a sheet size included in print settings is a user-defined size;
a decision unit configured to decide a fixed sheet size used for prohibition processing, based on a width and a height of the user-defined size with reference to a sheet size table if the determination unit determines that the sheet size included in the print settings is the user-defined size, wherein the prohibition processing includes determining whether or not an invalid combination of the print settings which cannot be set at a same time is present to eliminate the combination of the print settings which cannot be set at the same time;
a changing unit configured to change the sheet size in the print settings from the user-defined size to the fixed size decided by the decision unit;
a prohibition processing unit configured to perform the prohibition processing based on the print settings including the fixed size as changed by the changing unit; and
a generation unit configured to generate printing data,
wherein the changing unit reverts the sheet size of the print settings in which the prohibition processing has been performed from the fixed size to the user-defined size, and
wherein the generated printing data is transmitted to the printer and the printer prints, based on the print settings, the sheet size of which has been reverted, on a sheet according to the user-defined size.

* * * * *